July 12, 1938.   N. M. THOMAS   2,123,215
METHOD OF MOLDING MULTIFLAVORED FROZEN CONFECTIONS
Filed April 17, 1935   4 Sheets-Sheet 1
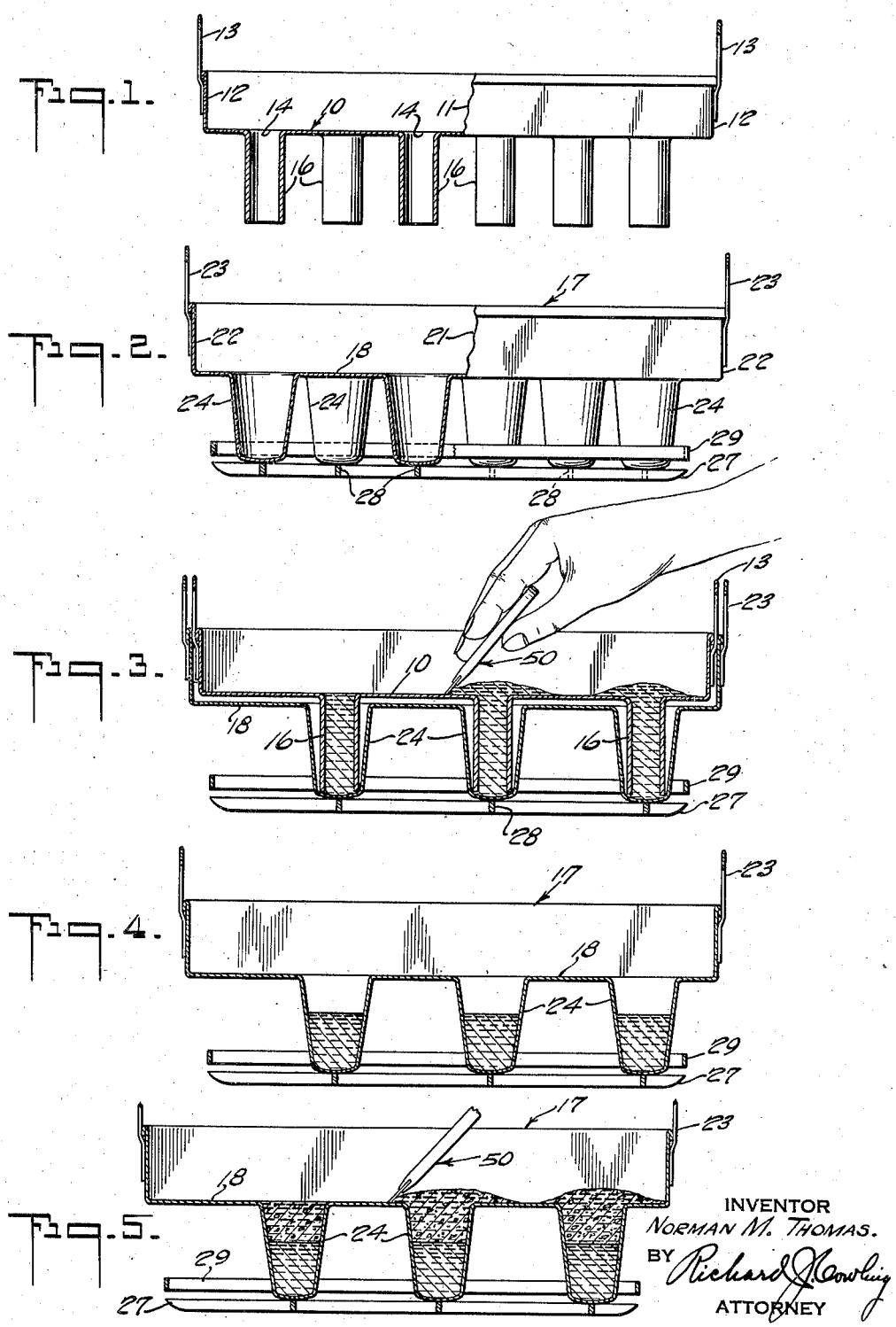
INVENTOR
NORMAN M. THOMAS.
BY Richard J. Cowling
ATTORNEY

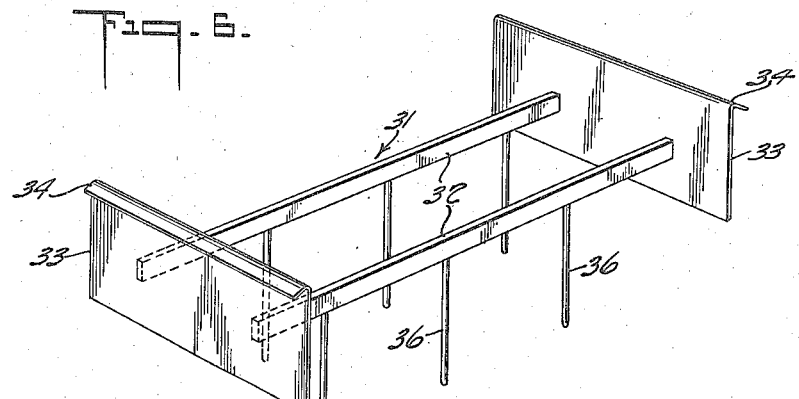
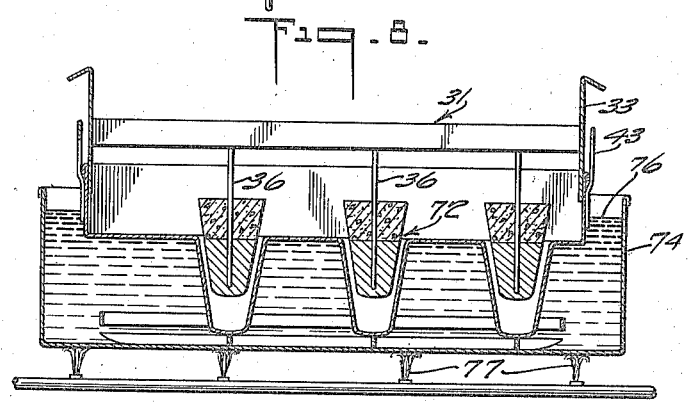
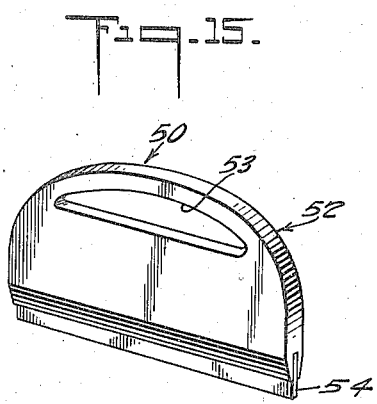
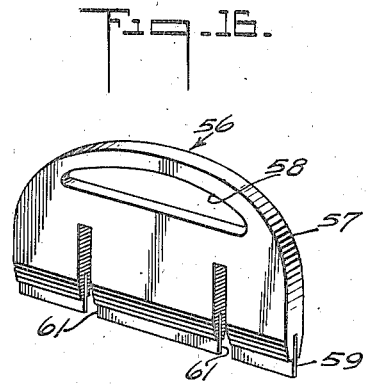

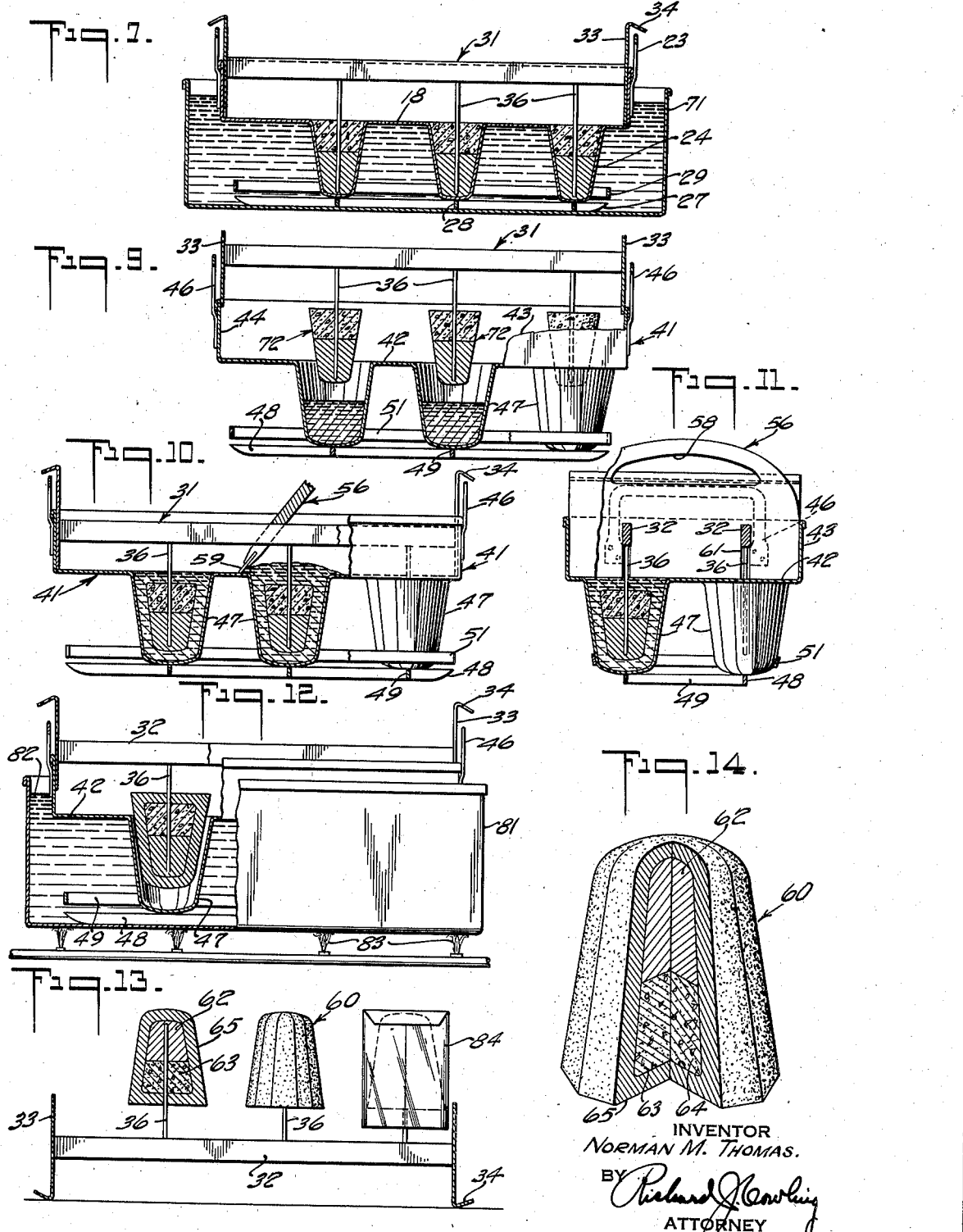

July 12, 1938.  N. M. THOMAS  2,123,215
METHOD OF MOLDING MULTIFLAVORED FROZEN CONFECTIONS
Filed April 17, 1935  4 Sheets-Sheet 4
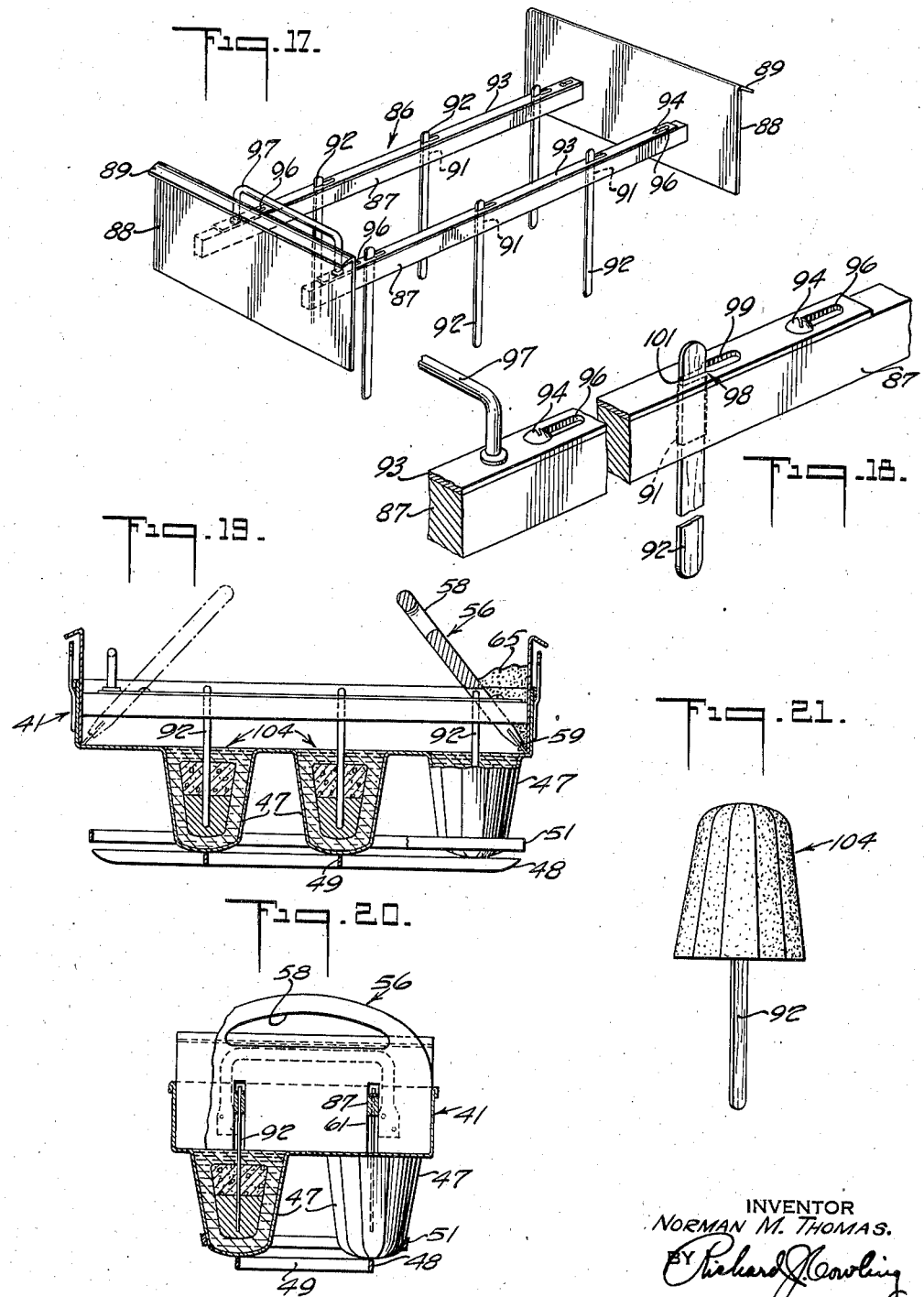
INVENTOR
NORMAN M. THOMAS.
BY Richard J. Cowling
ATTORNEY Patented July 12, 1938

2,123,215

UNITED STATES PATENT OFFICE 2,123,215

METHOD OF MOLDING MULTIFLAVORED FROZEN CONFECTIONS

Norman M. Thomas, Brooklyn, N. Y., assignor to Joe Lowe Corporation, New York, N. Y., a corporation of Delaware Application April 17, 1935, Serial No. 16,810

2 Claims. (Cl. 107—54)

The present invention relates to a method of forming, refrigerating and harvesting water-ice, sherbet, ice cream, frozen custard and the like, in individual servings or units, each serving consisting of a combination of different flavors of the same substance or of a combination of different substances, the servings being provided either with or without a handle member. The invention has particular relation to a new and improved method of and apparatus for making a plurality of such individual composite servings simultaneously in a most efficient, economical and sanitary manner.

Heretofore, confectionery products have been made in the form of individual servings consisting of various combinations of flavors and/or substances, but the disadvantages encountered in their manufacture with known methods have prevented their production on a large commercial scale. Such confectionery products were made either entirely by hand molding methods and refrigerating the materials in an ordinary ice cream plant hardening room, or were formed by a molding operation in which a plurality of hollow shells were made by various methods in multi-cavity molds, and the hollow centers or openings in said shells were subsequently filled with another kind of substance or with chopped fruits, nuts and the like. These methods had many disadvantages, and were very laborious, expensive and unsanitary. The present invention overcomes the disadvantages of the former methods, and permits the manufacture of such individual composite servings efficiently, cheaply and sanitarily on large scale production.

An object of the present invention is to provide a new and improved method of simultaneously manufacturing a plurality of individual multi-flavored and/or composite servings, with or without a handle member, in a most efficient, sanitary and economical manner.

Further advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part hereof, in which:

Fig. 1 is a side elevational view, partially in section, of the apparatus used in partially filling the individual molds with a measured amount of material;

Fig. 2 is a side elevational view, partially in section, of the mold structure used in forming the centers or cores of the composite servings;

Fig. 3 is a longitudinal sectional view of the filling apparatus shown in Fig. 1 and the mold structure shown in Fig. 2, showing the manner in which the filling apparatus is used in conjunction with the mold structure to partially fill the individual molds thereof with measured quantities of material, and illustrating the operation of a squeegee in leveling the tops of the filling tubes and removing the excess material from the filling apparatus;

Fig. 4 is a longitudinal sectional view of the mold structure shown in Fig. 3, with the filling apparatus removed, and showing the individual molds partially filled with one kind of material;

Fig. 5 is a longitudinal sectional view of the mold structure shown in Fig. 4, showing the molds completely filled with a second or different kind of material, and illustrating the operation of the squeegee in leveling the tops of the molds and removing the excess material from the mold structure;

Fig. 6 is a perspective view of the peg structure used in removing individual servings which are not provided with handle members from the molds, and for subsequently manipulating the servings during the remainder of the manufacturing operation;

Fig. 7 is a longitudinal sectional view of the mold structure of Fig. 5 with the peg structure of Fig. 6 positioned therein, and showing the combined apparatus positioned in a brine tank being subjected to refrigerating temperatures;

Fig. 8 is a longitudinal sectional view of the mold structure and peg structure shown in Fig. 7, being positioned within a defrosting tank of warm water, and illustrating the manner in which a plurality of servings are simultaneously removed from their individual molds by means of the peg structure;

Fig. 9 is a side elevational view, partially in section, illustrating the manner in which the individual servings removed from the molds in Fig. 8 are inserted into a second mold that is partially filled with material to be frozen;

Fig. 10 is a longitudinal sectional view, partially in elevation, showing the servings removed from the first molds in Fig. 8 completely submerged in the unfrozen material of the second molds, and illustrating the manner of removing the excess material from the second molds by means of a squeegee after the servings have been positioned therein;

Fig. 11 is an end view, partially in section, of the apparatus shown in Figure 10;

Fig. 12 is a side elevational view, partially in section, illustrating removal of the completed unitary servings from the second mold by means of the peg structure, while the apparatus is partly submerged in a defrosting tank of warm water;

Fig. 13 is a side elevational view, partially in section, showing how the composite unitary servings are covered with moisture proof bags while still remaining firmly fastened to the peg structure shown in Fig. 6;

Fig. 14 is an enlarged perspective view, partially in section, illustrating a handleless composite serving made in accordance with my invention;

Fig. 15 is an enlarged perspective view of the squeegee shown in Figs. 3 and 5, which is used for leveling and removing the excess material from both the filling apparatus and the first mold structure;

Fig. 16 is an enlarged perspective view of the squeegee shown in Figs. 10 and 11, which is used for leveling and removing the excess material from the second mold after the peg structure has been positioned therein;

Fig. 17 is a perspective view of a modified form of peg structure, wherein the pegs are removable wooden handle members adapted to become a part of the completed composite servings;

Fig. 18 is an enlarged, detailed, perspective view of one of the bars of the peg structure shown in Fig. 17, illustrating the manner in which the pegs are removably fastened therein;

Fig. 19 is a longitudinal sectional view, partially in elevation, showing the peg structure of Fig. 17 positioned within the mold of Fig. 9, and illustrating the manner in which the excess material is removed by the squeegee of Fig. 16 from the mold pan;

Fig. 20 is an end view, partially in section, of the apparatus shown in Fig. 19; and Fig. 21 is a perspective view of the composite unitary serving made with the apparatus shown in Figs. 17 to 20, inclusive, wherein it is provided with a handle member to facilitate eating.

Referring now to the drawings, there is shown in Fig. 1 a filling pan 10, having upstanding sidewalls 11 and end walls 12, the latter having handles 13 mounted thereon for lifting and transporting the same. The pan 10 is provided with a plurality of spaced openings 14, arranged in two parallel rows and having integral tubular projections or filling tubes 16 extending downwardly therefrom, the tubes of one row being staggered with respect to the tubes of the other row.

The mold structure 17, shown in Figures 2, 3, 4, 5 and 7, consists of a pan 18, having upstanding sidewalls 21 and end walls 22, the latter being provided with handles 23 for raising and transporting the mold structure 17. The mold pan 18 has a plurality of separate molds 24, adapted to receive material, depending therefrom and being formed integrally therewith, said molds 24 being spaced in two parallel rows with the molds of one row being staggered with respect to the molds of the other row. A runner 27 is mounted, by spot-welding or other suitable means, to the bottoms of the molds 24 of each row, upon which the mold structure is adapted to rest or be moved by sliding along the floor, table or other support. The runners 27 are rigidly connected transversely of the mold structure 17 by means of suitable brace rods 28. A metal band or bumper guard 29 is mounted around the lower ends of the molds 24, being securely welded to each of the molds 24, for bracing the lower ends thereof and to protect the molds 24 from being damaged.

The rack or peg structure 31, shown in Fig. 6, consists of two spaced parallel bars 32 mounted between end plates 33, the upper ends of which are bent outwardly, as indicated at 34, to provide handle means for facilitating manipulation of the rack. A plurality of spaced depending pegs 36 extend downwardly from the underside of the bars 32, the pegs of one bar being staggered with respect to the other bar to correspond to the spacing of the molds 24 of the mold structure 17.

Referring generally to Figs. 9 to 12, inclusive, of the drawings, there is shown a second mold structure 41, which is similar in construction to the mold structure 17, except that the individual molds are larger in size and of a different ornamental shape. This mold structure 41 consists of a pan 42, having upstanding sidewalls 43 and end walls 44, the latter being provided with handles 46 for raising and transporting the same. The mold pan 42 has a plurality of spaced separate molds 47 depending therefrom and being formed integrally therewith, said molds 47 being spaced in two parallel rows with the molds of one row being staggered with respect to the molds of the other row. Runners 48 are mounted on the bottoms of the molds 47, and are suitably braced with transversely extending brace rods 49. A metal band or bumper guard 51 is mounted around the lower ends of the molds 47, completely encircling the pendant molds of the mold structure 41 for bracing the same and providing protection for the molds 47 from damage.

The squeegee 50 shown in Fig. 15, consists of a rigid member 52, having an eliptical opening 53 in the upper portion thereof to provided handle gripping facilities for manipulating the same, and a flexible rubber scraping edge 54 adapted for removing excess material from the mold and filling apparatus shown in Figs. 3, and 5.

The squeegee 56 shown in Fig. 16 is intended to be used in conjunction with the peg structure 31, shown in Fig. 6, and consists of a rigid back member 57 having an eliptical opening 58 in the upper portion thereof to provide handle gripping facilities for manipulating the same, and a flexible rubber scraping edge 59, having spaced inwardly extending slots 61 adapted to receive and engage the parallel bars 32 of the peg structure 31, the bars forming a track for guiding the movement of the squeegee 56 in leveling and removing the excess material from the second mold structure 41, as best shown in Fig. 11.

The multi-flavored or composite unitary serving 60, shown in Fig. 14 of the drawings, consists of a central core formed with the upper portion 62 made of chocolate ice cream, and the lower portion 63 made of a fruit flavored ice cream having pieces of chopped fruits 64 therein, and then the entire core is covered with a layer of vanilla ice cream 66. It is obvious, however, that many different combinations of flavors may be used, or that the various parts of the serving 60 may be formed of other materials in other combinations, such as forming the portion 62 of ice cream, the portion 63 of frozen custard and covering the core with a layer of water-ice in place of the ice cream 66 without departing from the spirit of my invention.

In the manufacture of the serving 60, the apparatus shown and described in connection with Figs. 1 to 16 of the drawings is used in the following manner: The molds 24 of the mold structure 17 are partially filled with chocolate ice cream 62 by placing the filling apparatus shown in Fig. 1 in the molds shown in Fig. 2, as illustrated in Fig. 3, and a quantity of chocolate ice cream 62 is placed in the filling pan 10. The ice cream 62, when it is placed in the filling pan 10, is soft and semi-plastic or fluid, capable of flowing, and runs down into the filling tubes 16. After the tubes 16 are filled level with the top of the pan 10, a squeegee 50 is manually operated, as shown in Fig. 3, to force the ice cream 62 into any unfilled tubes and to remove the excess cream that may have been deposited therein. The amount of ice cream deposited in the molds 24 depends upon the volume of the filling tubes 16, and may be varied by increasing or decreasing the size of the tubes 16 as desired.

When the filling apparatus is removed from the mold structure 17, the ice cream or other material in the filling tubes 16, being capable of flowing, will run out the bottom and fill the lower portion of the molds 24, as shown best in Fig. 4. The unfilled portions of the molds 24 are then completely filled by pouring another kind or flavor of ice cream or other material, such as fruit ice cream 63 having particles of chopped fruit 64 therein, into the mold pan 18 of the mold structure 17. This second kind or flavor of ice cream 63 is likewise in a semi-fluid or plastic condition, substantially in the condition in which ice cream is drawn from a standard ice cream freezer, but the viscosities of the two substances are such that they will not tend to intermix. The excess of the substance 63 is removed from the mold pan 18 and/or forced into any unfilled molds 24 by manipulation of the squeegee 50, as shown in Fig. 5.

When the molds 24 of the mold structure 17 have been completely filled, the peg structure 31 of Fig. 6 is placed over the molds, the side and end walls of the mold structure 17 forming a guide for the ends 33 of the peg structure, thereby causing one of the pegs 36 to extend into each mold 24 and be centered therein. The mold structure 17 is then placed into a brine refrigerating tank 71, having circulating brine 72 therein, and the mold structure 17 is permitted to remain in the brine tank 71 until the contents 62 and 63 of the molds 24 have become solidly frozen into an integral mass or core 72 and bonded to the pegs 36. The mold structure 17 and contents are removed from the brine tank 71 and momentarily placed in a defrosting tank 74, containing warm water 76, which may be heated by any suitable means such as a gas burner 77, as best shown in Fig. 8. As soon as the bond between the frozen core 72 and the insides of the mold 24 is melted, the integral frozen masses or cores 72 are removed by lifting the peg structure 31 by the handle members 34, thereby withdrawing the pegs 36 from the molds 24 with the cores bonded thereto. See Fig. 8.

While the mold structure 17 is in the refrigerating tank 71, the mold structure 41, shown in Figs. 9 to 12, inclusive, may be partially filled with unfrozen or semi-frozen material. This mold is filled in the same manner in which the initial material is placed in the mold structure 17, as shown in Figs. 1 to 4, inclusive, using the same type of filling apparatus.

The peg structure 31, which has the integral masses or cores 72 clinging to the pegs 36 thereof, is immediately upon its withdrawal from the mold structure 17 placed over the mold structure 41, the ends 44 thereof acting as guides for the plates 33 of the peg structure, thereby centrally positioning each peg 36 and its core 72 over the molds 47. When the cores 72 are so lowered into the molds 47, they are submerged in the semi-fluid or liquid material 65 in the lower part thereof and thereby displace and force the liquid 65 up and entirely around the core 72 until the entire mold 47 is filled with material. By means of the squeegee 56, having slots 61 therein adapted to engage and ride on the top of the bars 32, as best shown in Figs. 10 and 11, the displaced material is smoothed out to form the bottom of the serving and the excess material may be removed from the mold structure 41.

The mold structure 41 is next placed in a refrigerating brine tank (not shown), which is similar in every respect to the brine tank shown in Fig. 7, until the contents thereof are solidly frozen and congealed into a unitary mass or serving. Upon removal of the mold structure 41 from the brine tank, it is momentarily placed in a defrosting tank 81, containing hot water 82, which is heated by means of gas flames 83, as shown in Fig. 12. As soon as the bond is broken between the servings 60 and the insides of the molds 47, the former may be removed from the mold structure 41 by lifting up on the peg structure 31, the servings 60 still being bonded to the pegs 36 thereof. While the confections or servings 60 are bonded to the pegs 36, moisture proof paper bags 84 may be slipped over them. By this time the metal of the peg structure 31 has picked up enough heat from the room to weaken the bond between the pegs 36 and the servings 60 so that the latter may be easily removed manually from the peg structure.

Referring to Figs. 17 to 21 of the drawings, wherein I have shown a modified form of peg structure, wherein the pegs are removable from the structure and may be left in the finished servings to provide handle members therefor by which the servings may be held and manipulated while being eaten.

The modified form of peg structure 86, shown in Figs. 17 to 20, inclusive, consists of two spaced parallel bars 87 mounted between end plates 88, the upper ends of which are bent outwardly to provide handles 89 for facilitating manipulation of the structure. The bars 87 of the peg structure 86 are provided with a plurality of spaced vertically extending openings 91, which are adapted to receive removable pegs in the form of wooden handle sticks 92. The pegs 92 of the bars 87 are staggered to correspond to the spacing of the molds 24 and 47 of the mold structures 17 and 41. The pegs 92 are securely fastened in the openings 91 of the bars 87 by movable bars 93, slidably mounted on the tops of the bars 87 by screw bolts 94 operating in longitudinal slots 96. The bars 93 are moved with respect to the bars 87 manually by means of a handle 97 mounted adjacent one end thereof. The bars 93 are provided with a plurality of longitudinal slots 98 having an enlarged portion 99 and a narrow tapering portion 101, the enlarged portion 99 of the slots 98 coinciding with the openings 91 of the bars 87 when the handle 97 is moved to the extreme left, which is its filling and releasing position. When the handle 97 is moved as far as it will go to the right of the peg structure 86, the narrow tapering portion 101 is moved to coincide with the openings 91 of the bars 87, thereby engaging the handle members 92, which have been positioned in said openings 91, and firmly binding them between the bars 87 and the bars 93 by a wedging operation. The pegs 92 may be released from the peg structure 86 by merely moving the handle 97 to the left, which moves the bars 93 a corresponding distance to the left and brings the enlarged portion 99 of the slots 98 over the openings 91 in the bars 87 and at the same time forces the pegs 92 out of the narrow slots 101. The enlarged portion 99 of the slots 98 is too large to engage the pegs 92, and the weight of the servings 104, which are bonded to the lower ends thereof, causes the pegs 92 to drop out of the peg structure 86. However, the pegs 92 being firmly bonded to the servings 104 remain therein and form handles by which they may be manipulated while being eaten.

The method of making the modified serving 104 is identical with the method described for making the serving 60, except, however, that the peg structure 86 is substituted for the peg structure 31, and when the peg structure 86 is removed from the mold structure 41, with the unitary servings clinging to the pegs 92 thereof, the handle 97 of the peg structure 86 is moved to the left and the pegs 92 are released therefrom, the pegs 92 remaining in the frozen unitary and composite mass to form a handle member therefor.

Although I have not described a chocolate coated or other coated confection, it is obvious that any of the servings, either the handleless serving 60 or the serving 104 which is provided with a handle, may be coated by dipping the servings in a bath of molten chocolate or other coating material (not shown) while they remain secured to the pegs 36 and 92 of the peg structures 31 and 86, as shown in Fig. 12.

Although I have only described in detail two modifications which my invention may assume, it will be apparent to those skilled in the art that the invention is not so limited, but that various other modifications may be made therein without departing from the spirit thereof or from the scope of the appended claims.

What I claim is:—

1. The method of forming, refrigerating and harvesting a multi-flavored unit serving, which comprises the steps of partially filling a mold with a substance to be frozen, filling the remainder of the mold with another kind of substance, positioning a peg within the mold and into the substances to be frozen, subjecting the mold and contents to refrigeration until frozen into an integral mass and the substances bonded to said peg, removing the contents of the mold by means of said peg, positioning the same within a second mold containing a substance to be frozen, subjecting the second mold and contents to refrigeration until the latter is frozen into a unitary serving, and then removing said serving from the second mold by means of said peg.

2. The method of simultaneously forming, refrigerating and harvesting a plurality of multi-flavored unitary servings which comprises partially filling a plurality of spaced molds with a substance to be frozen, completely filling said molds with a second substance to be frozen of a different character, placing a rod in each mold so that the rod extends through the second substance and the lower portion thereof extends into the first substance whereby the substances become independently bonded to the rods and to the mold walls when subjected to refrigeration, breaking the bonds between the substances and the mold walls, simultaneously withdrawing all of the rods with the substances bonded thereto, simultaneously immersing the substances so bonded to the rods into a second group of molds partially filled with a third substance to be frozen, subjecting the second group of molds to refrigeration whereby the third substance becomes bonded to the rods, first and second substances and to the mold walls, breaking the bond between the third susbtance and the mold walls, and simultaneously separating all of the rods with the three substances independently bonded thereto from the second group of molds.

NORMAN M. THOMAS.